United States Patent [19]

Bontems

[11] Patent Number: 5,203,082
[45] Date of Patent: Apr. 20, 1993

[54] PIPE INSERT AND METHOD OF INSTALLATION

[75] Inventor: Thomas A. Bontems, Tempe, Ariz.

[73] Assignee: Arizona Mist Outdoor Cooling Systems, Inc., South Los Feliz, Ariz.

[21] Appl. No.: 750,183

[22] Filed: Aug. 26, 1991

[51] Int. Cl.$^5$ .............................................. B21D 53/00
[52] U.S. Cl. ............................ 29/890.141; 29/525.1; 156/73.5; 156/294
[58] Field of Search .................... 29/890.14, 890.141, 29/505, 525, 525.1; 156/73.5, 294; 228/2, 112; 239/548, 550; 264/249

[56] References Cited

U.S. PATENT DOCUMENTS

| | | | |
|---|---|---|---|
| 2,566,502 | 9/1951 | Smith | 137/73 |
| 3,240,434 | 3/1966 | Bradley | 239/547 |
| 3,411,384 | 11/1968 | Ver Nooy | 77/37 |
| 3,447,755 | 6/1969 | Cartwright | 239/551 |
| 3,789,868 | 2/1974 | Menzel | 137/317 |
| 3,841,558 | 10/1974 | Fowler et al. | 239/11 |
| 4,058,262 | 11/1977 | Burnham | 239/545 |
| 4,712,809 | 12/1987 | Legris | 29/890.14 X |
| 4,721,250 | 1/1988 | Kennedy et al. | 239/383 |
| 4,784,409 | 11/1988 | Piechowiak | 156/73.5 X |
| 4,784,709 | 11/1988 | Unger et al. | 156/73.5 X |
| 4,787,956 | 11/1988 | Hoefer et al. | 156/73.5 X |
| 4,866,839 | 9/1989 | Covey | 156/73.5 X |
| 4,949,744 | 8/1990 | Heed et al. | 137/15 |

Primary Examiner—Timothy V. Eley
Attorney, Agent, or Firm—Jordan M. Meschkow; Don J. Flickinger; Lowell W. Gresham

[57] ABSTRACT

A plastic pipe with an insert, to which attachments can be coupled, installed therein, so as to cause the plastic of said plastic pipe to bond to said insert by surface flow and a method of installing a metal insert in a plastic pipe using pressure and friction to cause a surface flow of pipe material.

5 Claims, 3 Drawing Sheets

PIPE INSERT AND METHOD OF INSTALLATION

BACKGROUND OF THE INVENTION

1. Field of the Invention

This invention relates to pipe fixtures.

More particularly, the present invention relates to a pipe with inserts and a method of installing the inserts.

In a further and more specific aspect, the present invention relates to pipes with inserts for use in a misting system.

2. The Prior Art

Since pipes have been used to carry fluids and other material, fixtures have been needed to perform various functions. One problem has always been attaching those fixtures to the pipe securely and with no leakage. This problem was solved in a number of different ways. Pipes made of metal, such as copper, had threaded ends and threaded holes could be formed in the pipe to accommodate attachments and fixtures. Since these pipes were rigid, and the fixtures were attached by threading them to the pipe, leakage was minimal, especially if a sealer was used. While still in use, metal pipes are expensive, heavy, and sometimes difficult to use.

At the present time, pipes constructed from plastics or a polyvinyl material of some kind are in common use. Polyvinyl chloride (PVC) is the material of choice. PVC is used a great deal in water delivery systems because it is inexpensive and reasonably simple to use. The pipes can be easily coupled using a coupling and PVC glue, and fixtures made of PVC can be attached the same way. Holes can be drilled in the pipe, and other fixtures attached and sealed using glue or sealant. While PVC is relatively simple to use and effective, once a fixture is attached it is generally not removeable.

In hot dry climates, a system for cooling reasonably large outdoor areas, such as patios and porches, or humidifying indoor areas, such as warehouses or woodworking areas, has been developed and is gaining in popularity. These systems use a piping structure and misting heads to spray a fine mist of water particles, which evaporate and cool an area. The piping is generally fixed to the exterior perimeter of a building, patio cover or awning. Since this system requires a lot of pipe, PVC is generally used to reduce weight, price, and make installation easier and thus more economical. Typically, the pipe is coupled together and tapped on site. Brass mist heads are generally used, and screwed directly into the PVC after it has been tapped. Since the misting heads are usually affixed every two feet, tapping the pipe on site can be a very tedious and difficult task, and often results in systems that leak at the head-pipe junction.

Several other disadvantages of the prior art exist. On-site tapping of installed pipe leaves PVC shavings in the system, which can clog the misting heads. Frequent removal and re-installation of the brass misting heads, in order to remove the clogs and clean the heads, can cause the brass threads to strip the softer PVC threads resulting in greater leaks or rendering that pipe unusable. The tapping of the pipe is also imprecise, sometimes resulting in cross-threading during installation of the head. Also, the pressure in the system is limited by the head-pipe coupling strength.

It would be highly advantageous, therefore, to remedy the foregoing and other deficiencies inherent in the prior art.

Accordingly, it is an object of the present invention to provide an improved method of attaching a metal insert to a plastic pipe.

A further object of the present invention is to provide an improved pipe assembly for a misting system.

Another object of the present invention is to provide a plastic pipe with a metal insert to which a fixture can be coupled.

And another object of the present invention is to provide a plastic pipe with a metal insert, which allows fixtures to be removed and re-attached without damaging the pipe.

Still another object of the present invention is to provide a method for installing a metal insert in a plastic pipe at the factory for accurate and consistent installation.

Yet another object of the present invention is to provide a plastic pipe with a metal insert which can be used without introducing pipe shavings into the system it is attached to.

Another object of the present invention is to provide a plastic pipe with a metal insert to which a fixture can be attached with substantially no leakage.

Yet still another object of the present invention is to provide a plastic pipe with a metal insert which can be used to increase the pressure capability of a misting system.

And another object of the present invention is to provide an improved method for fabricating pipes with metal inserts installed at intervals.

SUMMARY OF THE INVENTION

Briefly, to achieve the desired objects of the present invention in accordance with a preferred embodiment thereof, provided is a pipe formed from a plastic material, and a metal insert. An opening is drilled in the pipe, then the insert is installed in the drilled opening, using a tapping head. The insert is attached to the tapping head and inserted into the drilled opening. The insert is sealed in place by pipe material flowing around and bonding to the insert. The pipes with inserts installed can then be coupled together on site, and fixtures such as misting heads can be attached by screwing them into the insert.

BRIEF DESCRIPTION OF THE DRAWINGS

The foregoing and further and more specific objects of the present invention will become readily apparent to those skilled in the art from the following detailed description of a preferred embodiment thereof taken in conjunction with the drawings, in which.

DESCRIPTION OF THE PREFERRED EMBODIMENT

Figure 1:
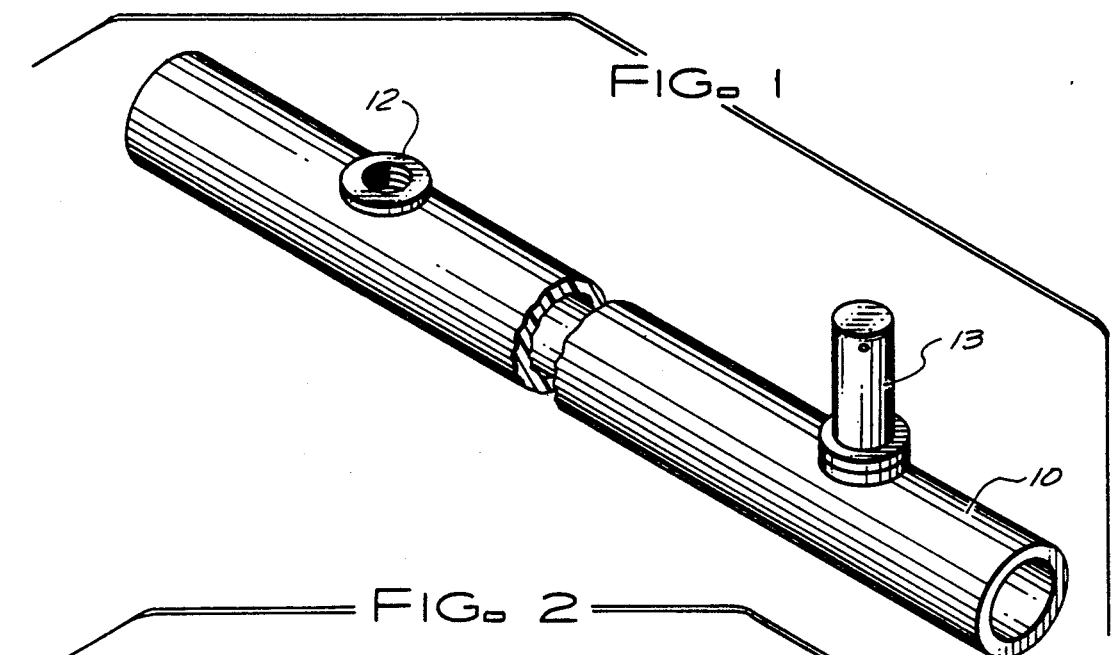
FIG. 1 is a perspective view of piping for a misting system, constructed in accordance with the teachings of the present invention, illustrating a specific use of the pipe insert.
Figure 2:
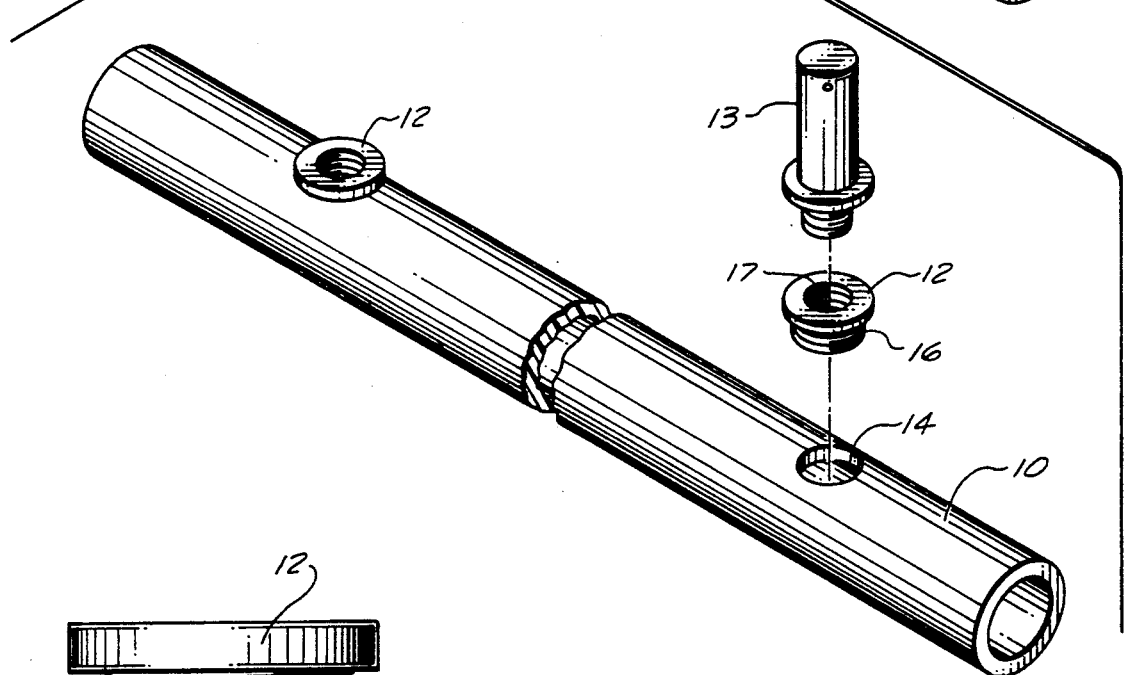
FIG. 2 is an exploded view of the misting system piping illustrated in FIG. 1.

Turning now to the drawings in which like reference characters indicate corresponding elements throughout the several views, attention is first directed to FIGS. 1 and 2 which illustrate a plastic pipe 10 with metal insert 12 installed. For purposes of this disclosure, it will be understood that plastic pipes include any pipes made from plastics, polyvinyl chloride (PVC), or other poly material. Plastic pipes 10 using metal insert 12 can be employed for any use which requires attachment of fixtures. In the preferred embodiment of the present invention, plastic pipe 10 and metal insert 12 are used in piping structures for misting systems. A misting system generally consists of PVC piping routed and fixed to the exterior perimeter of a building, patio, or awning. The pipes are coupled together to form a pipe structure, which is capped at one end and coupled to a pressurized water source at the other end.

Pipe structures for a misting system should be light, since they are suspended overhead, easy to install for economic reasons, and strong enough to withstand pressures sufficient for a misting system. Therefore PVC is generally used. The present invention allows metal insert 12 to be installed in a PVC pipe 10 so that a brass mist head 13 can be easily attached. While a brass misting head is preferred, those skilled in the art will understand that any misting head could be used.

Figure 5:
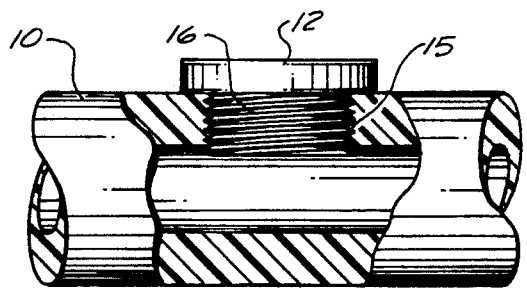
FIG. 5 is a cross sectional side view of a pipe with an insert installed.

Turning now to FIG. 5, metal insert 12 is shown installed and sealed in insert opening 14 of pipe 10. When metal insert 12 is installed in plastic pipe 10, a seal 15 forms between the material of plastic pipe 10 and metal insert 12. This produces an effectively leakless pipe to insert joint. The seal will also allow metal insert 12 to be able to withstand pressures in excess of 1000 P.S.I. This permits larger misting systems, which require greater water pressure, to be constructed. Brass mist head 13 may be added or removed at will, with no resulting damage to plastic pipe 10 or metal insert 12. This is very important, allowing mist heads 13 to be cleaned without creating a larger leak and eventually destroying plastic pipe 10. When used for misting systems, a metal insert 12 is installed approximately every two feet along plastic pipe 10. The installation of metal insert 12 is accomplished in the factory, allowing very precise installation and reducing the time and effort needed for installation on site. The method of installing metal insert 12 will be discussed fully infra.

Figure 3:
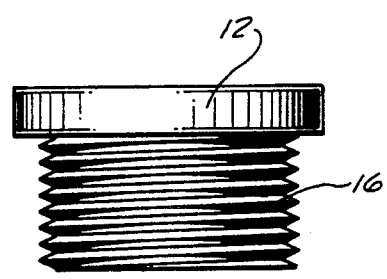
FIG. 3 is a side view of an insert used in the present invention.
Figure 4:
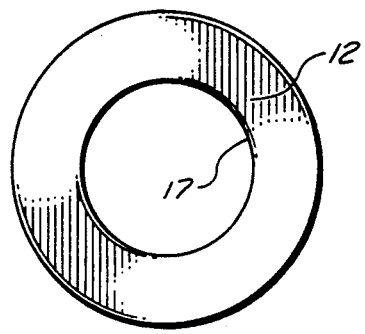
FIG. 4 is a top view of the insert illustrated in FIG. 3.

Referring now to FIGS. 3 and 4, it can be seen that metal insert 12 is generally cylindrical in shape. In the preferred embodiment, metal insert 12 is made of brass to match misting head 13, and has threads 16 on the outside. Metal insert 12 acts as a coupling for joining attachments, such as brass misting head 13, to plastic pipe 10. Therefore, metal insert 12 also has a threaded interior 17 into which an attachment can be threaded. It will be understood by those skilled in the art, that while the outside of metal insert 12 is threaded in the preferred embodiment, metal insert 12 may also be self-tapping or have a smooth outer surface. These different types of inserts 12 will be discussed in greater detail in the description of the installation method. Outer threads 16, the part inserted into insert opening 14, is 3/16 of an inch in this embodiment, used with ½ inch PVC schedule 40 piping. The dimensions of metal insert 12 may vary with the fixture being attached, but should not extend across the inside of plastic pipe 10, thereby blocking the flow of water.

Figure 6:
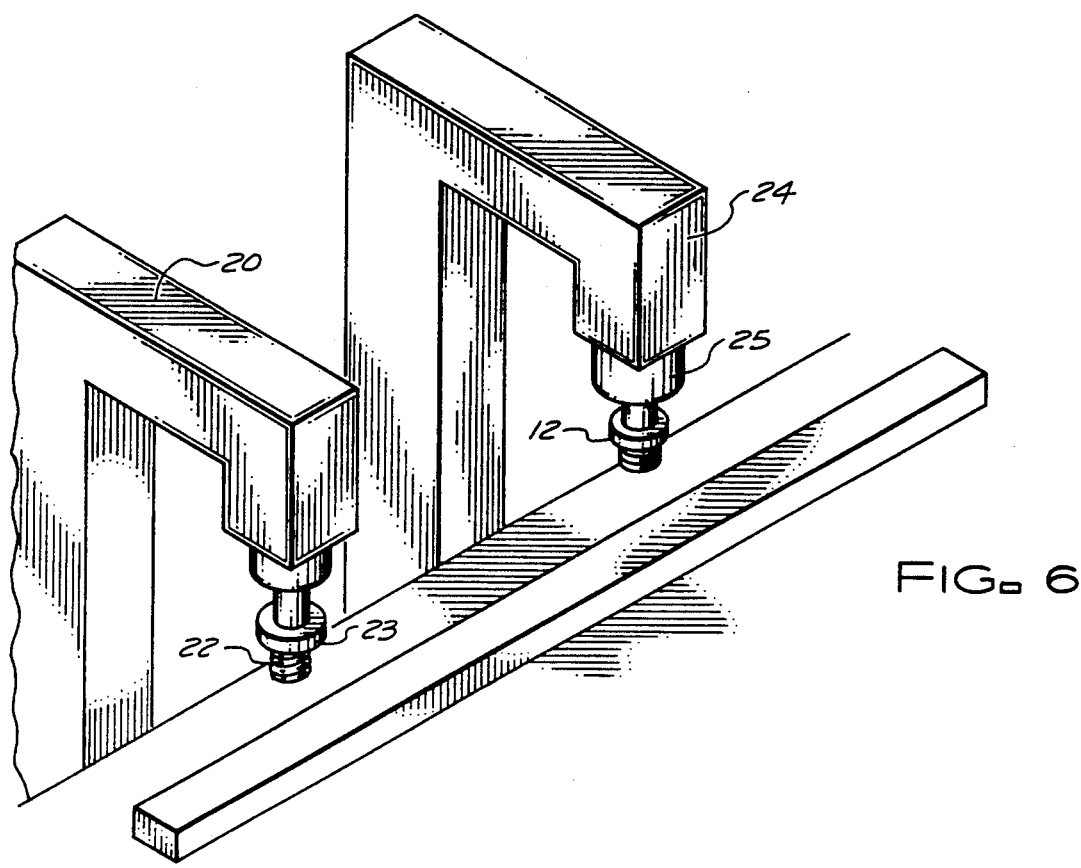
FIG. 6 is a perspective view of the double drill set-up for installing the insert in a pipe.

FIGS. 6–9 illustrate the method of installing metal insert 12 in a plastic pipe 10. FIG. 6 shows the double drill apparatus employed for the installation. A first drill press 20 is fitted with a specially machined bit 22 to form insert opening 14 in plastic pipe 10. A stop 23 is fixed above the cutting end of bit 22, to prevent it from drilling completely 23 through plastic pipe 10. In this embodiment, bit 22 is ¼ inch, but this will depend upon the diameter of metal insert 12. A second drill press 24 is fitted with a Tapmatic TM drill-tapping head 25 and a tap tooling 27. Second drill press 24 is separated from first drill press 20 by an interval of approximately 24 inches. The interval separating first drill press 20 from second drill press 24 is compatible with the desired interval between metal inserts 12 in plastic pipe 10. First and second drill presses 20 and 24 respectively, are fixed along a table 28 to which a jig 29 is affixed. Jig 29 is used to guide and hold plastic pipe 10 parallel to a line between bit 22 and drill-tapping head 25.

Figure 7:
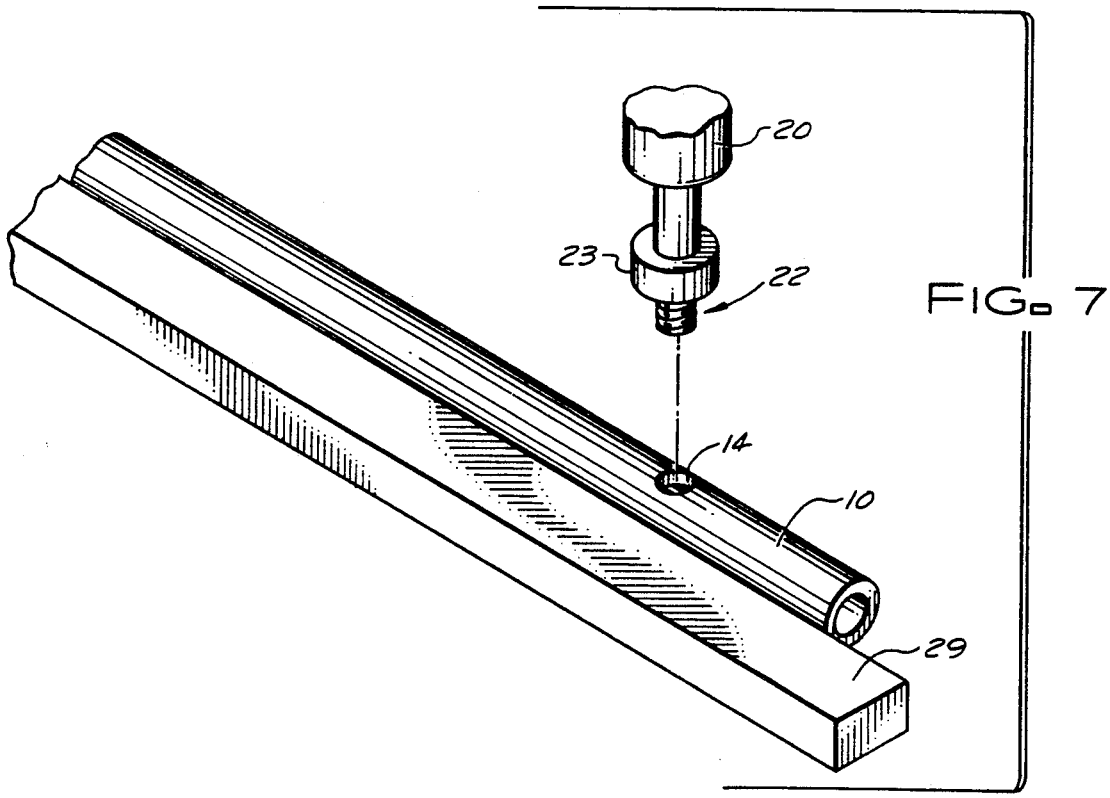
FIG. 7 is an partial perspective view, illustrating the step of forming an opening in the pipe.

Referring now to FIG. 7, the first step in installing metal insert 12 into plastic pipe 10 is to form insert opening 14. Plastic pipe 10, which may be of any length, is set in jig 29. First drill press 20 is used to form a ¼ inch hole through one side of plastic pipe 10. When bit 22 completes insert opening 14, and before bit 22 touches the opposite side of plastic pipe 10, stop 23 contacts plastic pipe 10 and prevents any further drilling. The bit is then removed from insert opening 14. The formation of insert opening 14 may be avoided if a self tapping insert is used. In that case, metal insert 12 is installed directly into plastic pipe 10 as discussed below.

Figure 8:
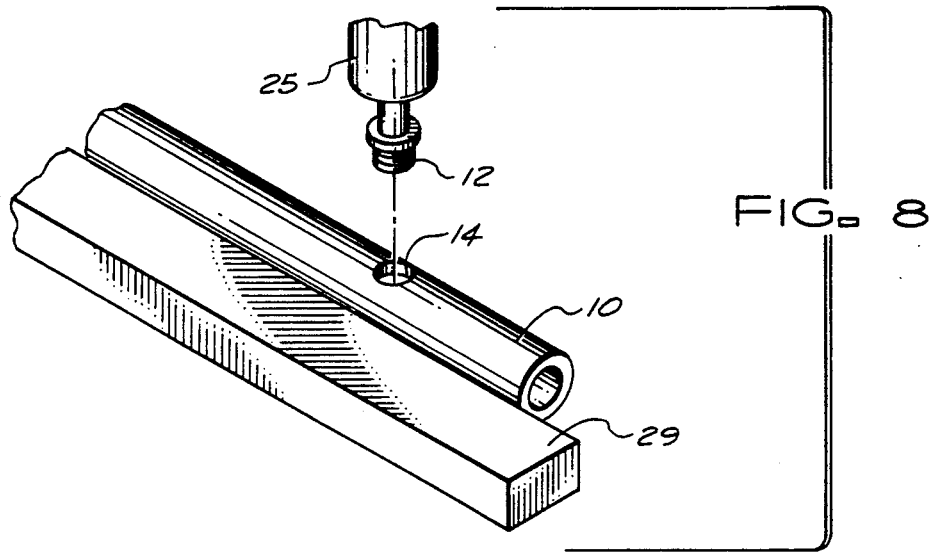
FIG. 8 is an partial perspective view, illustrating installing the insert in the pipe.

Plastic pipe 10 is then advanced along jig 29 until the previously formed insert opening 14 aligns with second drill press 24 as illustrated in FIG. 8, unless a self tapping insert is used, in which case no insert opening 14 is necessary. At this point, both drill presses can be lowered, simultaneously forming another insert opening 14 and installing insert 12 in the previously formed insert opening 14. Second drill press 24 is used to install and seal metal insert 12 in insert opening 14. Metal insert 12 is coupled to second drill press 24 by threading interior threads 17 onto tap tooling 27. Drilling-tapping head 25 is a Tapmatic TM drill-tapping head which allows metal insert 12 to be installed with a specific inch pounds of torque, and engages tap tooling 27, which has been especially tooled to have threads compatible with interior threads 17 of metal insert 12. Tap tooling 27, with metal insert 12, is then lowered towards insert opening 14. When metal insert 12 is lowered, it begins to pull itself into insert opening 14. The pressure and the friction produced from the spinning insert causes a slight surface flow of the pipe material. The flow of material contacts and completely surrounds metal insert 12, forming seal 15, which is strong and substantially leak free. While the temperature produced by the friction is below the melting point of PVC, for example, the heat and pressure actually sinters the PVC material to metal insert 12. Seal 15 eliminates the need for any special glue, Teflon ® tape, or pipe dope.

Figure 9:
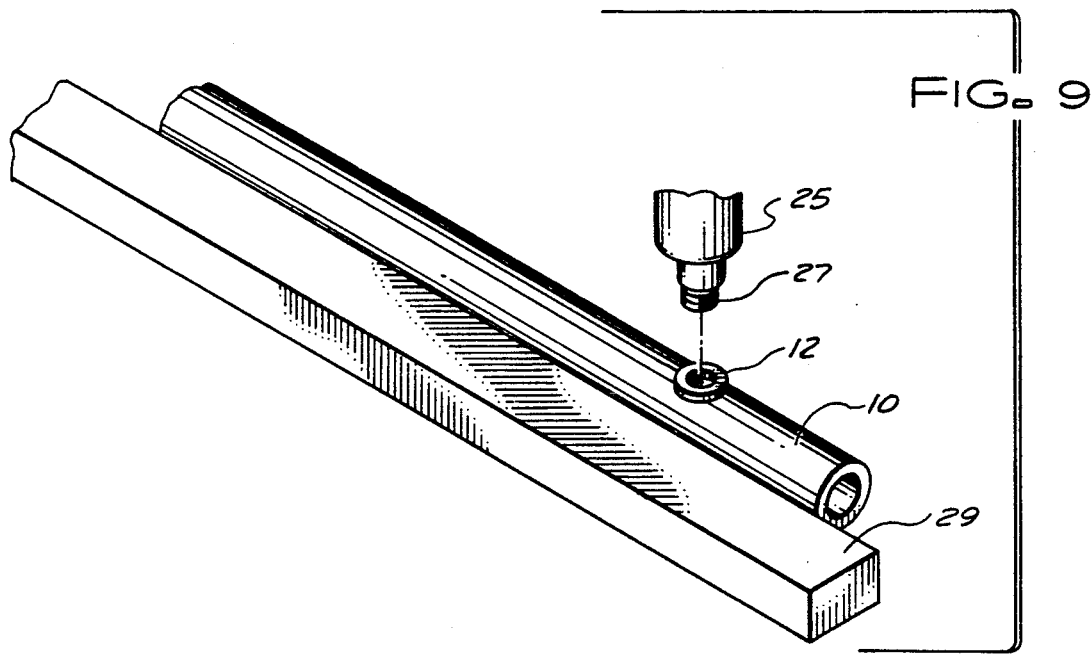
FIG. 9 is an partial perspective view, illustrating removing the tapping head from the installed insert.

Turning now to FIG. 9, once metal insert 12 is firmly installed, second drill press 24 reverses and withdraws tap tooling 27 from metal insert 12. In the preferred embodiment, approximately 5 inch pounds of torque for a ½ inch PVC schedule 40 pipe is used. The reversal of drill-tapping head 25 is automatic, and based on the specific setting of the Tapmatic TM. The specific setting may vary with the pipe or type of insert used.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of installing a metal insert in a plastic pipe comprising the steps of:
   providing a plastic pipe having a longitudinal axis;
   forming an insert opening in said plastic pipe, lateral with respect to said longitudinal axis;
   providing a metal insert; and
   installing said insert in said insert opening of said plastic pipe so as to cause the plastic of said plastic pipe to bond to said insert.

2. A method as claimed in claim 1 wherein the step of installing includes providing a drill press with a tap adapted to thread into said insert, threading one of said plurality of inserts onto said tap, rotating said insert with said drill press, and inserting said rotating insert into said insert opening by operating said drill press, producing pressure and friction between said insert and said pipe, resulting in said insert bonding to said pipe.

3. A method of constructing a fluid delivery system comprising the steps of:
   providing a plurality of plastic pipes each having a longitudinal axis;
   forming a plurality of insert openings in each of said plastic pipes, lateral with respect to said longitudinal axis;
   providing a plurality of metal inserts;
   providing a plurality of attachments;
   installing one of said plurality of metal inserts in each of said plurality of insert openings of said plastic pipes so as to cause the plastic of said plastic pipes to bond to said inserts;
   coupling said pipes together, with said inserts installed, to form a pipe structure; and
   coupling said attachments to said inserts.

4. A method as claimed in claim 3 wherein the step of includes providing a drill press with a tap adapted to thread into said inserts, threading one of said plurality of inserts onto said tap, rotating said insert with said drill press, and inserting said rotating insert with said insert opening by operating said drill press producing pressure and friction between said inserts and said pipes, resulting in said insert bonding to said pipe.

5. A method as claimed in claim 4 wherein said pipe structure has an open end and a closed end and further includes coupling a pressurized water source to said open end of said pipe structure and attaching a misting head to each of said inserts, thereby forming a misting system.

* * * * *